United States Patent
Chatterjee et al.

(10) Patent No.: US 11,042,138 B2
(45) Date of Patent: Jun. 22, 2021

(54) AUTO DETECTION OF SIGNATURE AND NATIVE REFERENCE CHANGES FROM DATA SOURCES

(71) Applicant: Johnson Controls Technology Company, Auburn Hills, MI (US)

(72) Inventors: Abhigyan Chatterjee, Asansol (IN); Kaustubh Devasthali, Mumbai (IN); Braja Majumdar, Hooghly (IN); Rajesh C. Nayak, Karnataka (IN); Fajil Sutar, Mumbai (IN); Mukul Vashisth, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 202 days.

(21) Appl. No.: 16/155,256

(22) Filed: Oct. 9, 2018

(65) Prior Publication Data

US 2020/0110377 A1    Apr. 9, 2020

(51) Int. Cl.
*G05B 19/042* (2006.01)
*F24F 11/63* (2018.01)

(52) U.S. Cl.
CPC ............ *G05B 19/042* (2013.01); *F24F 11/63* (2018.01); *G05B 2219/2614* (2013.01)

(58) Field of Classification Search
CPC .......... G05B 19/042; G05B 2219/2614; G05B 2219/2642; G05B 15/02; F24F 11/63
See application file for complete search history.

(56) References Cited

U.S. PATENT DOCUMENTS

| | | | | |
|---|---|---|---|---|
| 6,829,635 | B1 * | 12/2004 | Townshend | H04L 51/14 709/206 |
| 2011/0040960 | A1 * | 2/2011 | Deierling | G06F 21/575 713/2 |
| 2011/0264276 | A1 * | 10/2011 | Kressner | H02J 13/00017 700/276 |

(Continued)

OTHER PUBLICATIONS

U.S. Appl. No. 16/026,621, filed Jul. 3, 2018, Johnson Controls Technology Company.

(Continued)

*Primary Examiner* — Meng Li
(74) *Attorney, Agent, or Firm* — Foley & Lardner LLP

(57) ABSTRACT

A processor is configured to receive an electronic item comprising an object signature and corresponding to a building infrastructure item, such as space, equipment, monitoring point, etc. The processor is configured to validate the object signature, including determining, based on the object signature, a data source associated with the building infrastructure item. For each of the plurality of data objects from the data source, where each data object corresponds to a particular installation of the building infrastructure item, the processor is configured to determine a signature suffix associated with a current version and/or current configuration of the particular installation. The processor is configured to generate a validated object signature, including appending the signature suffix to the object signature. The processor is configured to identify a target computing system and transmit the validated object signature to the target computing system (e.g., in the form of a representational state transfer (REST) message.).

28 Claims, 8 Drawing Sheets

(56) References Cited

U.S. PATENT DOCUMENTS

| | | | | |
|---|---|---|---|---|
| 2012/0123639 A1* | 5/2012 | Ochiai | ............. | G06F 1/3287 |
| | | | | 701/36 |
| 2015/0148971 A1* | 5/2015 | Acker | ............. | G05B 15/02 |
| | | | | 700/282 |
| 2015/0347539 A1* | 12/2015 | Holmes | ............. | G06F 16/254 |
| | | | | 707/602 |
| 2018/0253644 A1* | 9/2018 | Tan | ............. | G05B 13/0265 |
| 2020/0104110 A1* | 4/2020 | Singh | ............. | G06F 16/9014 |

OTHER PUBLICATIONS

U.S. Appl. No. 16/051,992, filed Aug. 1, 2018, Johnson Controls Technology Company.
U.S. Appl. No. 16/052,038, filed Aug. 1, 2018, Johnson Controls Technology Company.
U.S. Appl. No. 16/052,083, filed Aug. 1, 2018, Johnson Controls Technology Company.
U.S. Appl. No. 16/052,115, filed Aug. 1, 2018, Johnson Controls Technology Company.

* cited by examiner

AUTO DETECTION OF SIGNATURE AND NATIVE REFERENCE CHANGES FROM DATA SOURCES

BACKGROUND

The present disclosure relates generally to heating, ventilation, and air conditioning (HVAC) systems. The present disclosure relates more particularly to building management systems (BMS) and building enterprise management systems (BEMS).

BMS generally enable enterprise-wide control and management of various components of building infrastructures and HVAC systems. BEMS typically allow an operator to monitor different facilities/buildings, which may be located in disparate geographies. These buildings and facilities are usually complex in nature and may include physical facilities, various HVAC systems, and the like. Setting up a virtual BEMS topology that logically matches a physical structure becomes very challenging and time-consuming.

Where various customer sub-systems are connected to a BEMS gateway device associated with a BEMS, it becomes important to sync information regarding any source system changes, updates, etc. For instance, any time a version upgrade occurs on a source system, certain identifiers, such as FQR's and/or signatures of energy/equipment points are changed. Currently, no data fetching mechanism is available in conventional BEMS to identify changes in signatures/FQR of the points and sync these changes in substantially real time to the parent system (e.g., the BEMS). As a result, the conventional signature update process is largely manual, which is very costly and engineering-intensive. Furthermore, even in conventional systems where source identifiers may be tracked electronically, no mechanisms exist for monitoring BEMS gateway downtime and correctly applying any updates that may have occurred during that time.

SUMMARY

One implementation of the present disclosure is a building enterprise management system. The system comprises a non-transitory memory, a processor, and a processing circuit configured to execute computer-readable instructions stored in the non-transitory memory. The processor is configured to receive, from a source computing system, an electronic item corresponding to a building infrastructure item. The electronic item comprises at least an object signature. The processor is configured to validate the object signature. The processor is configured to determine, based on the object signature, a data source associated with the building infrastructure item. The data source comprises a plurality of data objects and each of the plurality of data objects corresponds to a particular installation of the building infrastructure item. For each of the plurality of data objects, the processor is configured to determine a signature suffix. The signature suffix is associated with at least one of a current version and a current configuration of the particular installation of the building infrastructure item. For each of the plurality of data objects, the processor is configured to generate a validated object signature, comprising append the signature suffix to the object signature. For each of the plurality of data objects, the processor is configured to identify a target computing system and transmit the validated object signature to the target computing system.

In some embodiments, the processor is further configured to, based on a pre-defined timing parameter, periodically obtain the electronic item corresponding to the building infrastructure item.

In some embodiments, the electronic item comprises a plurality of object signatures.

In some embodiments, the processor is further configured to, based on a pre-defined performance parameter comprising a predetermined record count, batch some of the plurality of validated object signatures into a data file according to the pre-defined performance parameter, wherein a number of validated object signatures in the data file does not exceed the predetermined record count. In some embodiments, the pre-defined performance parameter comprises an identifier of at least one of a building infrastructure item, the source computing system, and the target computing system. In some embodiments, the pre-defined performance parameter is based on a window of time corresponding to a non-operational state of at least one of the source computing system and the target computing system; and the processor is configured to determine validated object signatures only for object signatures updated during the window of time.

In some embodiments, the processor is configured to parse the data object to identify the building infrastructure item. The processor is configured, based on at least one rule associated with the building infrastructure item, to determine whether the data object is valid, generate an electronic notification indicative of whether the data object is valid, and transmit the electronic notification using a pre-determined notification method.

In some embodiments, the building infrastructure item is one of a physical space, an equipment item, and a monitoring point.

In some embodiments, the processor is further configured to obtain a stored configuration data object from the target computing system. The processor is configured to cause the source computing system to provide a current version of the data object corresponding to the stored configuration data object. The processor is configured to compare at least a portion of the data object to at least a portion of the stored configuration data object to determine whether the data object is valid.

In some embodiments, the stored configuration data object is received from the target computing system as representational state transfer (REST) message, and the processor is further configured to decode the REST message to extract the stored configuration data object.

In some embodiments, the validated object signature is transmitted to the target computing system as representational state transfer (REST) message.

Another implementation of the present disclosure is a controller communicatively coupled to a particular installation of a building infrastructure item. The controller is structured to determine an object signature of the building infrastructure item. The controller is structured to validate the object signature, comprising: generate, based on the object signature, a data object corresponding to the particular installation of the building infrastructure item; generate a signature suffix, wherein the signature suffix is associated with at least one of a current version and a current configuration of the particular installation of the building infrastructure item; generate a validated object signature, comprising append the signature suffix to the object signature; and transmit the validated object signature to a target computing system.

In some embodiments, the controller is structured, based on a pre-defined timing parameter, to periodically update the signature suffix and periodically generate the validated object signature comprising the signature suffix.

In some embodiments, the controller is structured to determine a window of time corresponding to a non-operational state of at least one of the particular installation of a building infrastructure item and the target computing system. The window of time comprises at least a start time and an end time. In some embodiments, the controller is structured to update the signature suffix and generate the validated object signature. In some embodiments, the controller is structured to transmit the validated object signature and the window of time to the target computing system.

In some embodiments, the building infrastructure item is one of a physical space, an equipment item, and a monitoring point.

In some embodiments, the controller is structured to obtain a stored configuration data object from the target computing system. The stored configuration data object corresponds to the data object corresponding to the particular installation of the building infrastructure item. In some embodiments, the controller is structured to compare at least a portion of the data object to at least a portion of the stored configuration data object to determine whether the data object is valid. In some embodiments, the controller is structured to generate an electronic notification indicative of whether the data object is valid and transmit the electronic notification to the target system.

In some embodiments, the validated object signature is transmitted to the target computing system as representational state transfer (REST) message.

Another implementation of the present disclosure is a method, such as a computer-implemented method. The method comprises receiving, by a processing circuit of a computing system, from a source computing system, an electronic item corresponding to a building infrastructure item. The electronic item comprises at least an object signature. In some embodiments, the method comprises validating, by the processing circuit, the object signature. In some embodiments, the method comprises determining, based on the object signature, a data source associated with the building infrastructure item, wherein the data source comprises a plurality of data objects and wherein each of the plurality of data objects corresponds to a particular installation of the building infrastructure item. In some embodiments, the method comprises, for each of the plurality of data objects, determining a signature suffix, wherein the signature suffix is associated with at least one of a current version and a current configuration of the particular installation of the building infrastructure item. In some embodiments, the method comprises, for each of the plurality of objects, generating a validated object signature, comprising append the signature suffix to the object signature. In some embodiments, the method comprises, for each of the plurality of objects, identifying a target computing system and transmitting the validated object signature to the target computing system.

In some embodiments, the method comprises, based on a pre-defined timing parameter, periodically obtaining, by the processing circuit, the electronic item corresponding to the building infrastructure item.

In some embodiments, the electronic item comprises a plurality of object signatures.

In some embodiments, the method comprises, based on a pre-defined performance parameter comprising a predetermined record count, batching, by the processing circuit, some of the plurality of validated object signatures into a data file according to the pre-defined performance parameter. A number of validated object signatures in the data file does not exceed the predetermined record count.

In some embodiments, the pre-defined performance parameter comprises an identifier of at least one of a building infrastructure item, the source computing system, and the target computing system. In some embodiments, the pre-defined performance parameter is based on a window of time corresponding to a non-operational state of at least one of the source computing system and the target computing system. In some embodiments, the method comprises determining, by the processing circuit, validated object signatures only for object signatures updated during the window of time.

In some embodiments, the method comprises parsing the data object to identify the building infrastructure item. In some embodiments, the method comprises, based on at least one rule associated with the building infrastructure item, determining whether the data object is valid. In some embodiments, the method comprises generating an electronic notification indicative of whether the data object is valid. In some embodiments, the method comprises transmitting the electronic notification using a pre-determined notification method.

In some embodiments, the building infrastructure item is one of a physical space, an equipment item, and a monitoring point.

In some embodiments, the method comprises obtaining, by the processing circuit, a stored configuration data object from the target computing system. In some embodiments, the method comprises causing, by the processing circuit, the source computing system to provide a current version of the data object corresponding to the stored configuration data object. In some embodiments, the method comprises comparing, by the processing circuit, at least a portion of the data object to at least a portion of the stored configuration data object to determine whether the data object is valid.

In some embodiments, the stored configuration data object is received from the target computing system as representational state transfer (REST) message, and wherein the processor is further configured to decode the REST message to extract the stored configuration data object.

In some embodiments, the validated object signature is transmitted to the target computing system as representational state transfer (REST) message.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
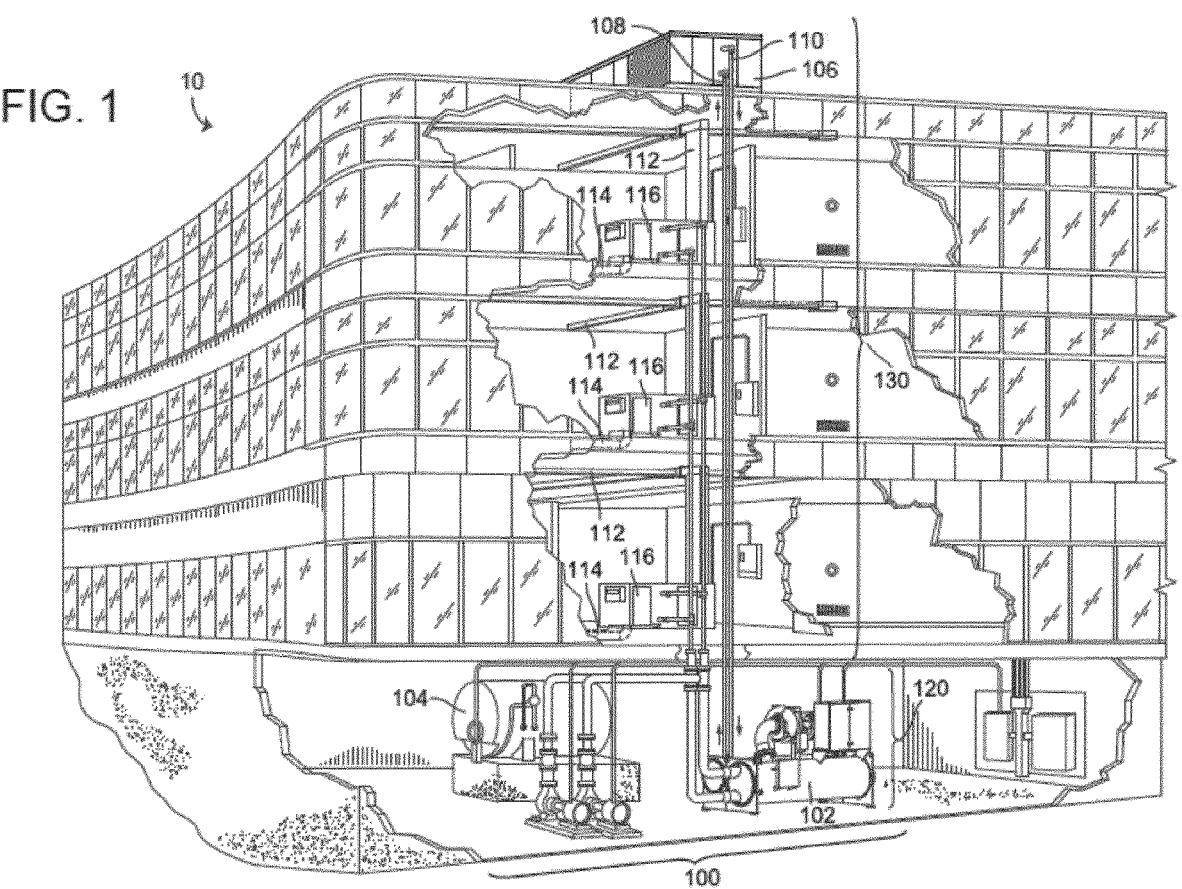
FIG. 1 is a schematic drawing of a building equipped with a HVAC system, according to an example embodiment.

Referring generally to the FIGURES, a building management system (BMS) is shown, according to various example embodiments. The building management system or a plurality of building management systems can be configured to provide data to an building enterprise management system (BEMS). In some embodiments, the data is provided via a BEMS gateway system and/or component. The BEMS gateway system and/or component can be communicatively coupled to the BMS and the BEMS, and may include a processing circuit. The processing circuit may include a memory and a processor. The memory may include a data propagation circuit and/or an interface engine, which, in some embodiments may be combined. The data propagation circuit is structured to collect, disseminate and synchronize streams of data exchanged between the BMS and the BEMS and/or between or within various components thereof. The interface engine is configured to encode, decode, receive, and transmit the various data items (e.g., messages) included in the data streams.

Some embodiments of the present disclosure provide methods and systems for auto detection of signature and native reference changes from data sources. In an example embodiment, the processor of the BEMS gateway system is configured to receive an electronic item comprising an object signature and corresponding to a building infrastructure item, such as space, equipment, monitoring point, etc. The electronic item is received from a source system, such as BMS. The processor is configured to validate the object signature, including determining, based on the object signature, a data source associated with the building infrastructure item. For each of the plurality of data objects from the data source, where each data object corresponds to a particular installation of the building infrastructure item, the processor is configured to determine a signature suffix associated with a current version and/or current configuration of the particular installation. The processor is configured to generate a validated object signature, including appending the signature suffix to the object signature. The processor is configured to identify a target computing system (e.g., a BEMS) and transmit the validated object signature to the target computing system (e.g., in the form of a representational state transfer (REST) message.)

In some embodiments, various components of the BMS, BEMS, and the BEMS gateway system can be omitted and/or combined. For example, in some embodiments, some or all of the functionality of the data propagation circuit and/or the interface engine can be performed by the BMS and/or the BEMS such that the BEMS gateway is omitted or incorporated into the BEMS. In some embodiments, the above functionality can be embodied as computer-executable instructions on a controller associated with a component of the BMS, such as a particular installation of a building infrastructure item (e.g., the BMS controller 366 described in reference to an example embodiment of FIG. 3.)

Building Management System and HVAC System

Referring now to FIGS. 1-4, an example building management system (BMS) and HVAC system in which the systems and methods of the present invention can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
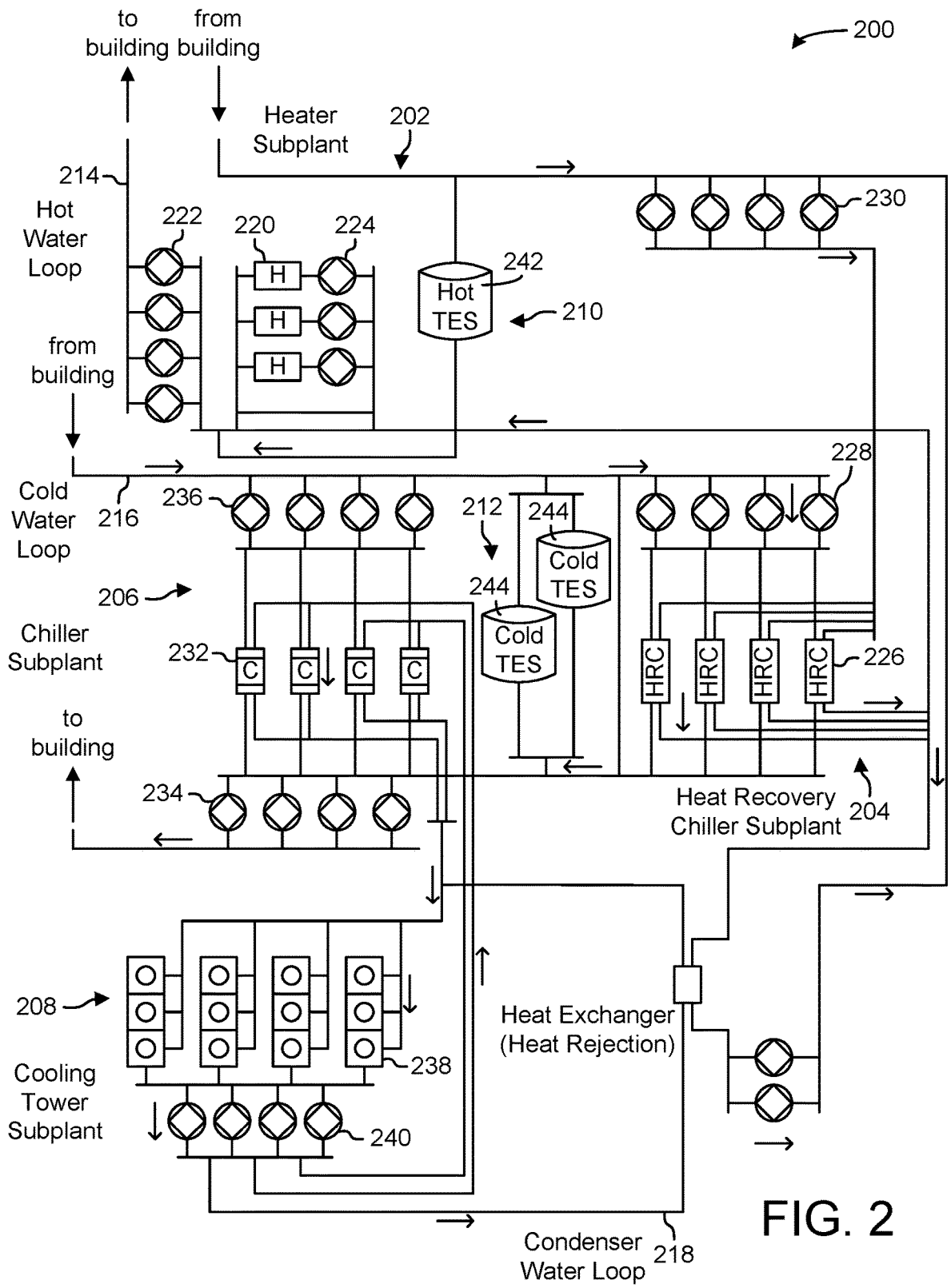
FIG. 2 is a schematic block diagram of a waterside system that may be used in conjunction with the building of FIG. 1, according to an example embodiment.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
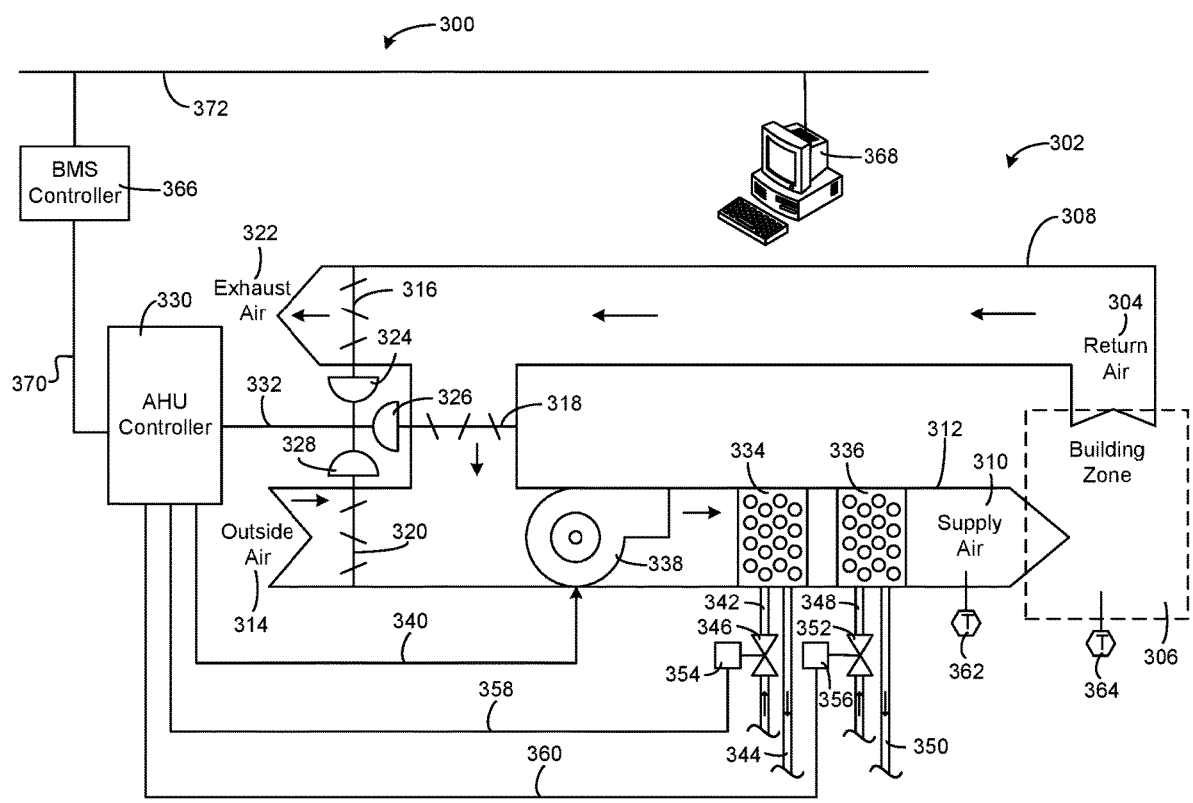
FIG. 3 is a schematic block diagram of an airside system that may be used in conjunction with the building of FIG. 1, according to an example embodiment.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100

(e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
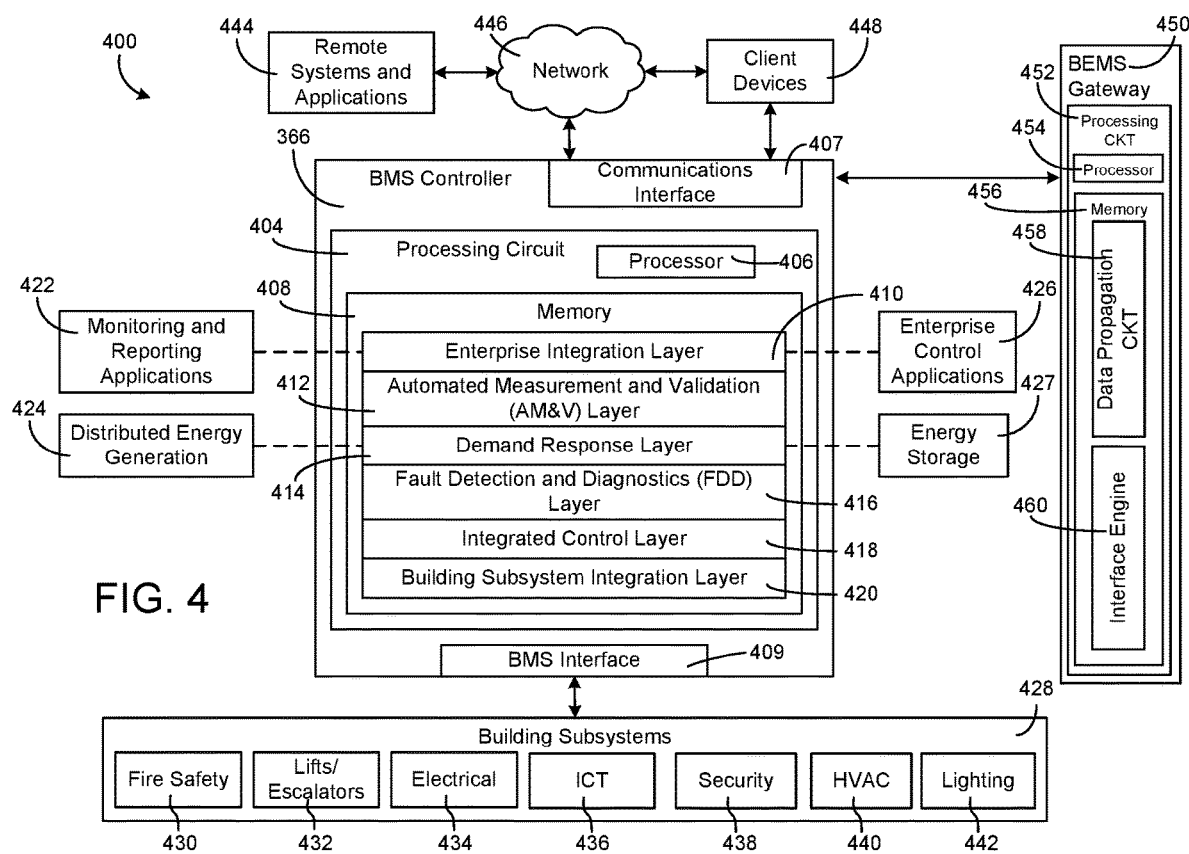
FIG. 4 is a schematic block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems

428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Still referring to FIG. 4, the BMS 400 is shown to be communicatively coupled to a BEMS gateway 450. The BEMS gateway 450 can be implemented as part of the BMS 400, as part of a BEMS (such as an enterprise control application 426 of FIG. 4 and/or BEMS 540 shown in FIG. 5), and/or as a stand-alone component communicatively coupled to the BMS 400 and/or BEMS 540 of FIG. 5. The BEMS gateway 450 may include components, circuits, and/or interfaces for exchanging electronic signals, messages and data with one or more BMS, BEMS, and the like. For example, in some embodiments, the BEMS gateway 450 can include an Ethernet card and port for sending and receiving data via an Ethernet-based communications link or network. In another example, the BEMS gateway 450 can include a Wi-Fi transceiver for communicating via a wireless communications network. In another example, the BEMS gateway 450 may include cellular or mobile phone communications transceivers.

Figure 5:
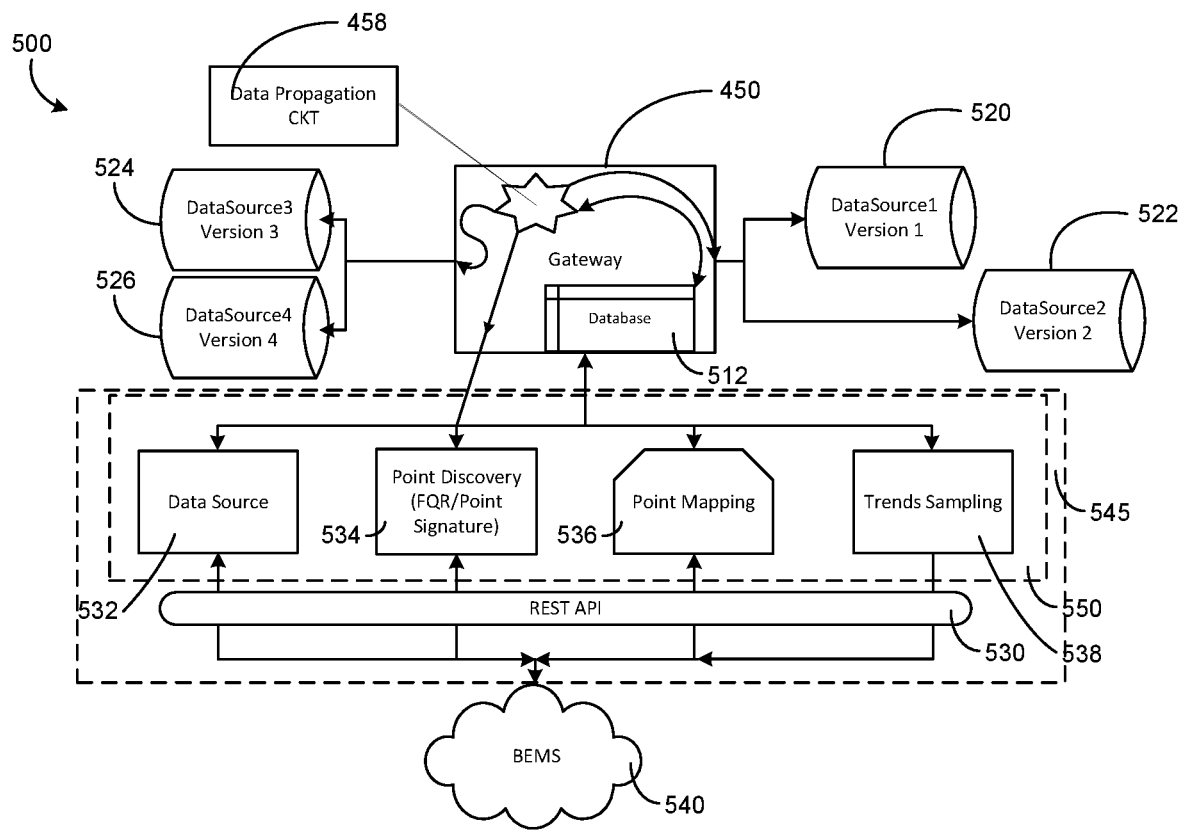
FIG. 5 is a schematic block diagram of a computing infrastructure for data synchronization between an example BMS and an example BEMS, according to an example embodiment.

The BEMS gateway 450 is structured to facilitate exchange and synchronization of data streams between one or more BMS 400 and the BEMS 540 of FIG. 5. According to various embodiments, the data streams may include various identifiers (e.g., object identifiers), performance information (e.g., equipment version, configuration, operating status, etc.), relational information (e.g., a mapping of a monitoring point to a physical space), etc. These items can be associated with components of one or more BMS 400 and/or the BEMS 540 of FIG. 5. According to various embodiments, the data streams can include data in various formats decodable by the BEMS gateway 450, such as electronic messages comprising plain text records and/or data files (e.g., batched plain text records), XML files, web service messages (e.g., messages structured according to an electronic messaging format, such as representational state transfer (REST), simple object access protocol (SOAP), web service definition language (WSDL), JavaScript object notation (JSON), XML remote procedure call (XML RPC), etc.), and the like.

The BEMS gateway 450 is shown to include a processing circuit 452. The processing circuit 452 is shown to include a processor 454 and a memory 456. The processor 454 can be a general purpose processor, an application specific integrated circuit (ASIC), one or more field programmable gate arrays (FPGAs), a group of processing components, or other suitable electronic processing components.

Memory 456 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 456 can be or include volatile memory or non-volatile memory. Memory 456 can include database components, object code components, script components, or any other type of information structure for supporting the various activities and information structures described in the present application. According to an example embodiment, memory 456 is communicably connected to processor 454 via processing circuit 452 and includes computer code for executing one or more processes described herein.

Memory 456 is shown to include a data propagation circuit 458 and/or an interface engine 460, which, in some embodiments, may be combined.

The data propagation circuit 458 is structured to collect, disseminate and synchronize streams of data exchanged between one or more BMS 400 and the BEMS 540 of FIG. 5. To that end, the data propagation circuit 458 can be structured to execute various object code components, script components, etc. The data propagation circuit 458 can be structured to manage (e.g., query, populate, index, optimize, delete data from, etc.) various data storage entities. In some embodiments, these functions can be combined in a hybrid implementation. An example of a hybrid implementation is an electronic structure managed by the data propagation circuit 458. The electronic structure can include a data storage entity that has a shell and/or includes an API such that a library of code (for example, executable functions containing Data Manipulation Language (DML) instructions) that may be used by entities within or outside the BEMS gateway 400 to query and manage the data storage entity.

Figure 6:
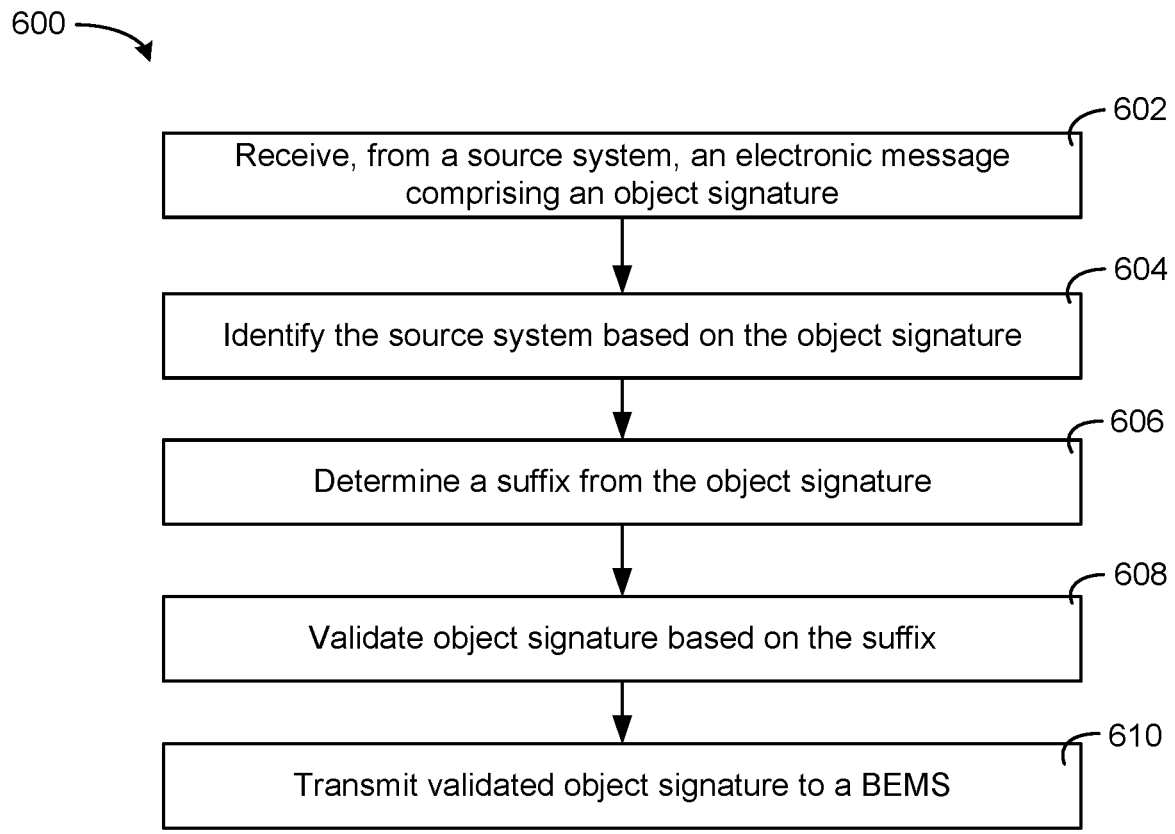
FIG. 6 is a flow diagram of a process for data synchronization between an example BMS and an example BEMS, including auto detection of signature and native reference changes from data sources, according to an example embodiment.
Figure 7:
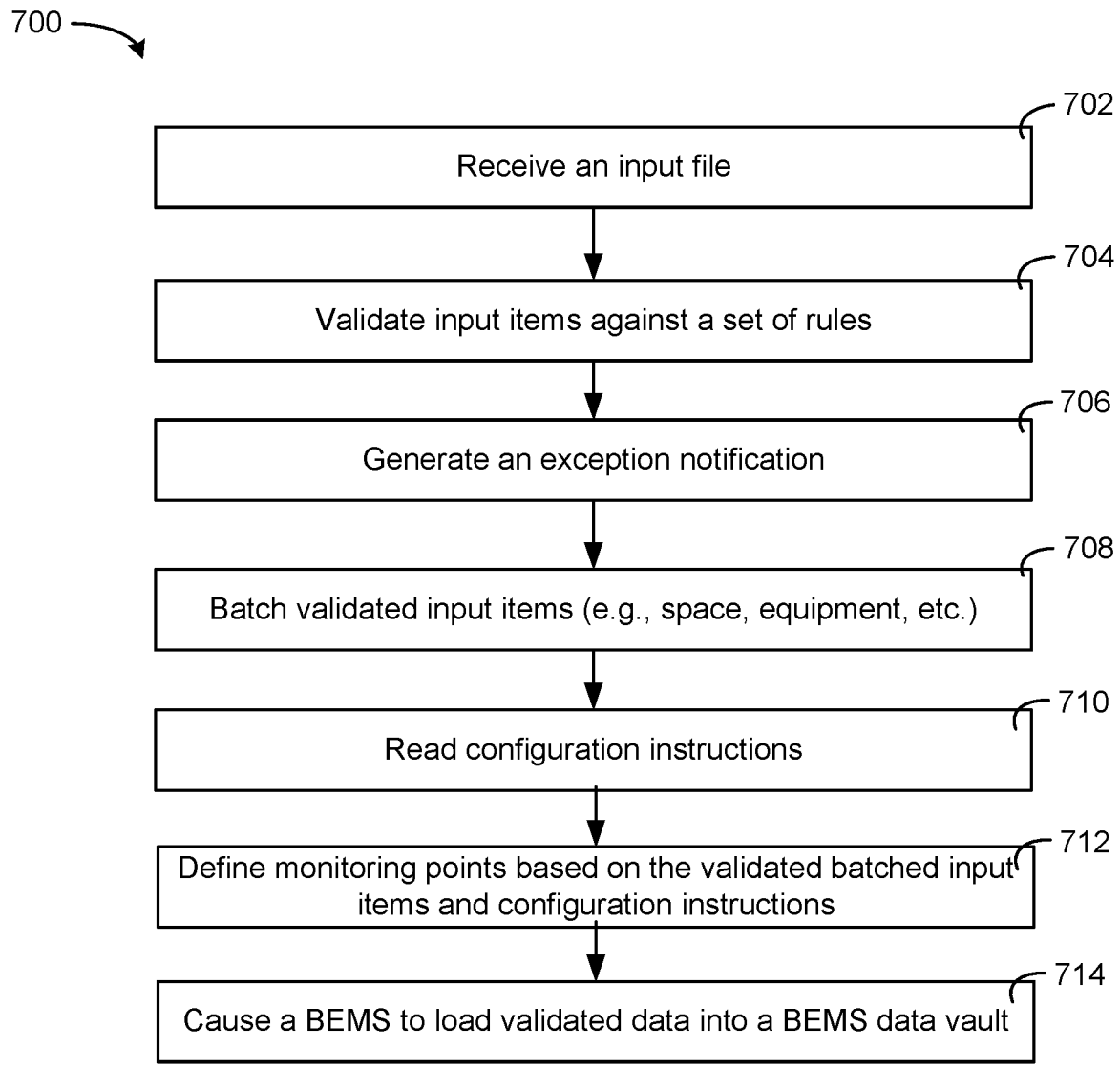
FIG. 7 is a flow diagram of a process for data propagation from an example BMS to an example BEMS, including auto configuration of setup involving space, meters, equipment, monitoring points, etc.
Figure 8:
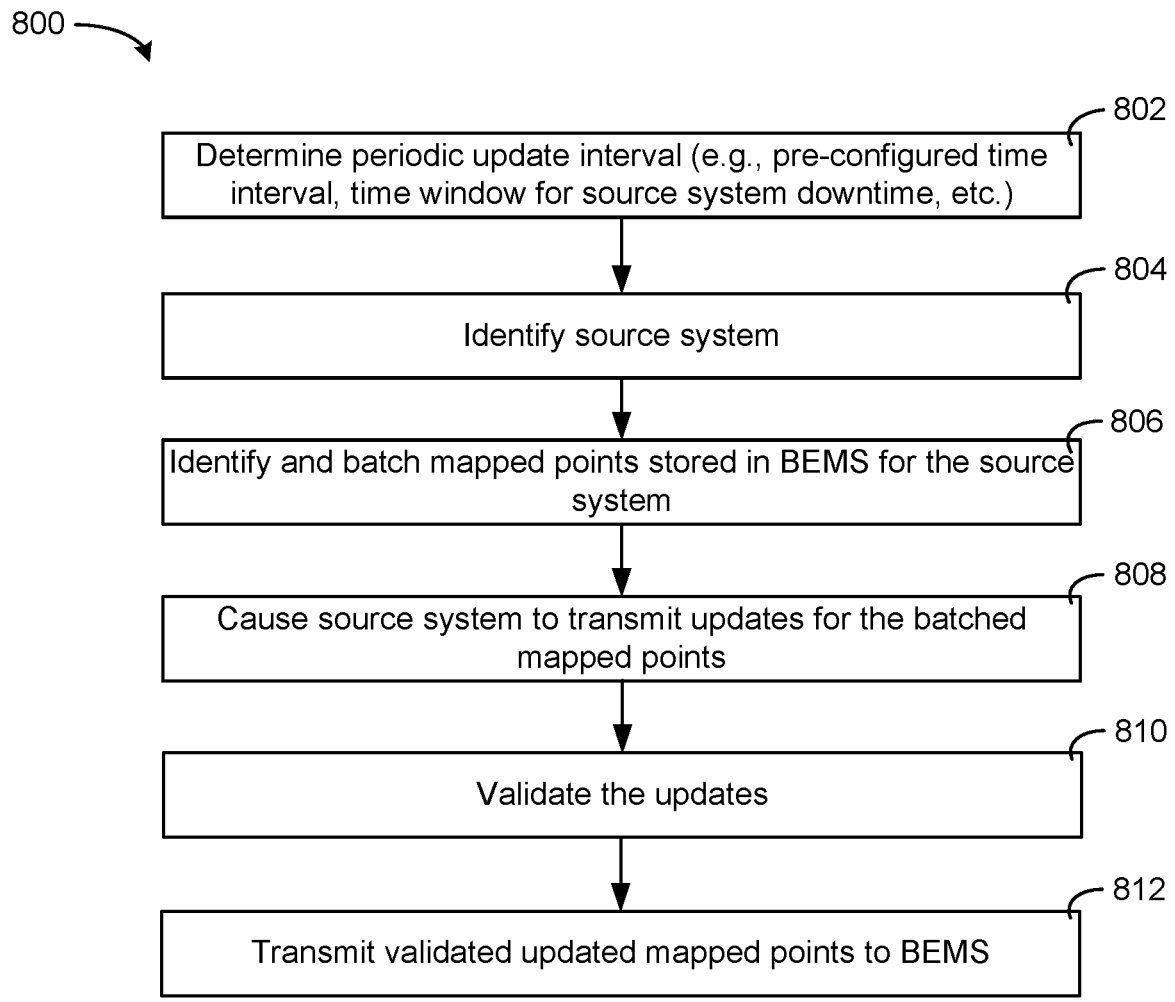
FIG. 8 is a flow diagram of a process for data synchronization between an example BMS and an example BEM, including automatically generating historical information requests for monitoring points missing data.

In some embodiments, the data propagation circuit 458 is structured to perform various processes for synchronizing and/or propagating data between one or more BMS 400 and the BEMS 540 of FIG. 5. As shown in FIG. 6, the data propagation circuit 458 can be structured perform operations and/or processes for auto detection of signature and native reference changes from data sources. As shown in FIG. 7, the data propagation circuit 458 can be structured to perform operations and/or processes for auto configuration of setup involving space, meters, equipment, monitoring points, etc. As shown in FIG. 8, the data propagation circuit 458 can be structured to perform operations and/or processes for automatically generating historical information requests for monitoring points (e.g., the monitoring points associated with one or more BMS 400) missing data.

The interface engine 460 is structured to encode, decode, receive, and transmit the various data items (e.g., messages) included in the data streams exchanged between one or more BMS 400 and the BEMS 540 of FIG. 5. According to various embodiments, the interface engine 460 can be implemented as software code suitable for compilation, object code, executable file(s) and/or code, a set of machine language instructions, and/or in another suitable form for carrying out the computer-implemented method(s) described herein. In some embodiments, some or all instructions executed by the interface engine 460 can be performed in a distributed fashion. For example, some or all instructions can be embodied and/or executed via a controller associated with the one or more BMS 400, such as the BMS controller 366.

In some embodiments, the interface engine 460 is or includes an application programming interface (API), such as the API 530 of FIG. 5. The API of the interface engine 460 may be configured to specify an appropriate communication protocol using a suitable data interchange format, including any of a SQL data set, a protocol buffer message stream, an instantiated class implemented in a suitable object-oriented programming language (e.g., Java, Ruby, C #, etc.), an XML file, a text file, an Excel file, a web service message in a suitable message format (e.g., representational state transfer (REST), simple object access protocol (SOAP), web service definition language (WSDL), JavaScript object notation (JSON), XML remote procedure call (XML RPC), etc.). In some embodiments, the interface engine 460 comprises or is communicatively coupled to one or more web service node(s) (not shown), which may be structured to encode, decode, send and receive REST messages, SOAP messages, WSDL messages, JSON messages, XML RPC messages, etc.

In some embodiments including an API, the BEMS gateway 450 and/or the interface engine 460 (e.g., a web service node thereof) may be identifiable to external systems via a unique network address, such as an IP address, a uniform resource locator (URL), etc. To that end, some or all components of the BMS 400 and/or BEMS 540 of FIG. 5 may include circuits structured to access and exchange data, via the interface engine 460 of the BEMS gateway 450, using a suitable remote procedure call protocol, such as Java remote method invocation (RMI), Windows distributed component object model (DCOM), etc. The web service node(s) may include a web service library comprising callable code functions. The callable code functions may be structured according to a predefined format, which may include a service name (interface name), an operation name (e.g., read, write, initialize a class, etc.), operation input parameters and data type, operation return values and data type, service message format, etc.

For example, one or more circuits of the BMS 400 may be structured to call a function of the API of the BEMS gateway 450 to retrieve data, provide data, etc. For instance, in some embodiments, a component of the BMS 400 may be structured to call a callable function of the API to query a data repository of the BEMS 540 of FIG. 5, via the BEMS gateway 450, to receive and verify the accuracy of BEMS data that represents BMS objects, such as space, equipment, monitoring points, etc. As another example, a component of the BMS 400 may be structured to "push" updated data (e.g., data relating to equipment upgrades, version changes, notifications, etc.) to the BEMS 540 of FIG. 5 and/or its client devices, via the BEMS gateway 450, by encoding and transmitting data via a callable function of the API.

Systems and Methods for Auto Detection of Signature and Native Reference Changes from Data Sources Referring now to FIG. 5, a schematic block diagram of a computing infrastructure 500 for data synchronization between an example BMS (e.g., the BMS 400 of FIG. 4) and an example BEMS (e.g., the BEMS 540) is shown, according to an example embodiment.

All or some components of the computing infrastructure 500 can be implemented as part of the BMS 400 (e.g., as control logic on a controller thereof), as part of the BEMS 540, as part of the BEMS gateway 450 of FIG. 4, etc. The computing infrastructure is shown to include the BEMS gateway 450 data sources 520, 522, 524, and 526, REST API 530, BEMS 540, and code library 550.

The BEMS gateway 450 includes the data propagation circuit 458 and is communicatively coupled to one or more data sources, such as data sources 520, 522, 524, and 526. The data sources provide the data streams, data files, electronic messages, etc. regarding the state of various components of a building infrastructure, such as equipment, space, monitoring points, etc. According to various embodiments, data sources 520, 522, 524, and 526 can be or are associated with various BMS 400. The data sources 520, 522, 524, and 526 can be implemented as log files (e.g., text, XML, etc.), databases, interface engines, programmable control structures, etc.

The BEMS gateway 450 is shown to include a database 512. The database 512 collects and/or stores information collected from the data sources 520, 522, 524, and 526 regarding the objects stored in data sources 520, 522, 524, and 526. This information can include performance information, configuration/version information, downtime information, system health polling information, etc. In some embodiments, the data propagation circuit 458 is configured to populate and/or update the database 512 by periodically polling the data sources 520, 522, 524, and 526. In some embodiments, the data sources 520, 522, 524, and 526 are configured to periodically "push" the relevant information to the BEMS gateway 450 for storage in the database 512. The database 512 can be implemented as one or more log files (e.g., text, XML, etc.), relationally structured data tables, interface engines, programmable control structures, etc. According to various embodiments, the database 512 resides (e.g., is installed in, written to, etc.) in transitory or non-transitory (persistent) storage media associated with the BEMS gateway 450, such as memory 456. In some embodiments where the database 512 is, for example, an appendable log file, the data is purged, in whole or in part up to a pre-defined temporal point, from the database 512 at periodic intervals, such as daily, weekly, on-demand (e.g., responsive to an instruction received through the API 530), etc.

The BEMS gateway 450 is communicatively coupled to the BEMS 540 through, for example an interface engine 460 shown in FIG. 4. In some embodiments, each of the BEMS gateway 450 and the BEMS 540 include wired or wireless communications interfaces (e.g., jacks, antennas, transmitters, receivers, transceivers, wire terminals, etc.) for conducting data communications through the interface engine 460 and/or the API 530. In various embodiments, communications via interfaces can be direct (e.g., local wired or wireless communications) or via a communications network (e.g., a WAN, the Internet, a cellular network, etc.). For example, interfaces can include an Ethernet card and port for sending and receiving data via an Ethernet-based communications link or network. In another example, interfaces can include a Wi-Fi transceiver for communicating via a wireless communications network.

In some embodiments, the interface engine 460 includes the API 530 and the code library 550. The interface engine can also include configuration and management modules (not shown) for managing the uptime of the interface engine, installing and/or managing software code packages associated with the API 530, etc. In other embodiments, the API 530 can reside (e.g., can be stored as a collection of executable files, etc.) on the web server 545, which can be an entity separate from the BEMS gateway 450. In still other embodiments, the API 530 can reside on a server associated with the BEMS 540, which can be an entity separate from the BEMS gateway 450 and the web server 545. In such embodiments, the API 530 is communicatively coupled to the interface engine 460 via, for example, a communications interface of the web server 545, a communications interface of the BEMS 540, etc.

The API 530 is structured to programmatically exchange structured messages, data, instructions, etc. between the BEMS gateway 450 the BEMS 540. As shown, the API 530 is a REST API configured to send and receive messages that contain data encoded using the representational state transfer (REST) protocol. However, the API 530 can be configured to specify an appropriate communication protocol using a suitable data interchange format, including any of a SQL data set, a protocol buffer message stream, an instantiated class implemented in a suitable object-oriented programming language (e.g., Java, Ruby, C #, etc.), an XML file, a text file, an Excel file, a web service message in a suitable message format (e.g., representational state transfer (REST), simple object access protocol (SOAP), web service definition language (WSDL), JavaScript object notation (JSON), XML remote procedure call (XML RPC), etc.). The API 530 can be structured to use suitable communication protocols to transmit or receive data messages, including, for example, any of the Internet protocol (IP), transmission control protocol (TCP), hypertext transfer protocol (http://), simple object access protocol (SOAP), file transfer protocol (FTP), etc. Secure versions of any of the above protocols (e.g., IPSec, https://, etc.) may be used as appropriate.

The API 530 is shown to include the code library 550. The code library 550 can be implemented as one or more executable files organized in directories, namespaces, etc. and accessible through the API 530. The code library 550 can include executable files for connecting to the data sources 520, 522, 524, and 526 (e.g., executable 532), point and signature discovery (executable 534), point mapping (executable 536), trends sampling (executable 538), etc. As defined herein, an executable is a callable API function embodied as a set of instructions stored in non-transitory media. The operations performed via executables 532, 534, 536, and 538 can be computer-based method steps described in reference to FIGS. 6-8. The callable functions of the API 530 and/or the code library 550 can be exposed (made public) and can be invoked by the data propagation circuit 458 of the BEMS gateway 450, by the appropriate circuit of the BEMS 540, by the appropriate circuit of the web server 545 (e.g., data "pull" requests through the BEMS gateway 450 from the data sources 520, 522, 524, and 526), etc.

Referring now to FIG. 6, a process 600 is shown for data synchronization between an example BMS and an example BEMS, according to an example embodiment. The API 530 of FIG. 5 can be configured to perform the process 600. Furthermore, the BMS controller 366, the BEMS 540, the BEMS gateway 450 and/or any other computing device as described herein can be configured to perform the process 600.

The process 600 includes auto detection of signature and native reference changes from data sources. Generally, building infrastructure items, such as spaces, equipment, monitoring points, etc. have unique signatures for each installation of a particular infrastructure item. According to various embodiments, a signature can be a numerical string, an alphanumeric string, and/or an alpha string, which can be delimited using various special characters (e.g., a pipe, a colon, a semicolon, a dash, etc.) A signature object can identify a particular infrastructure item. The signature object can include a suffix, which can be numeric, alphanumeric, alphabetical, etc. and can identify a particular installation of the infrastructure item, it current version, current configuration, etc.

Signature objects are stored in a data vault associated with the BEMS 540 and can be used to uniquely identify infrastructure items for maintenance, reporting, etc. When particular installations of infrastructure items are updated (e.g., upgraded, etc.), the suffix is changed in the source system (e.g., the BMS 400.) Conventionally, these changes are not propagated to the BEMS. The process 600 is structured to detect and propagate these changes to the BEMS 540.

In step 602, the API 530 is structured to receive, from the BMS 400, an electronic message. The electronic message can be a REST message, a JSON message, etc. The electronic message includes an object signature of the respective installation of the infrastructure item. In some embodiments, rather than or in addition to receiving the electronic message, the API 530 is structured to query a database (e.g., a data vault associated with the BEMS 540) to retrieve one or more object signatures, which can be compared to the received electronic message in order to determine any discrepancies.

In step 604, the API 530 is structured to identify a particular installation of an infrastructure item based on the object signature. For example, the API 530 can parse the object signature to identify a segment that identifies a particular BMS 400 or a component thereof.

In step 606, the API 530 is structured to determine a suffix from the object signature. For example, the API 530 can parse the object signature to identify the suffix.

In step 608, the API 530 is structured to validate the object signature based on its suffix. For example, the API 530 can be structured to query a database (e.g., a data vault associated with the BEMS 540) to retrieve one or more object signatures, which can be compared to the received electronic message in order to determine any discrepancies. In particular, the API 530 can be structured to parse a first object signature received at 602 to retrieve a first suffix, parse a second object signature retrieved from the BEMS 540 to retrieve a second suffix, and perform a string comparison function on the first suffix and the second suffix. In some embodiments, the API 530 can be structured to scrub the suffixes (e.g., eliminate field delimiters, eliminate extra space characters, etc.) prior to making a comparison. In some embodiments, the API 530 is structured to generate an updated (validated) object signature, which can include appending the first suffix to the object signature retrieved using a query such that the validated object signature reflects the latest configuration of the source system. As part of this process, any pre-existing second suffixes may be replaced.

In step 610, the API 530 is structured to transmit the validated object signature, in a new electronic message, to the BEMS 540.

In some embodiments, steps of the process 600 are performed periodically based on a pre-defined timing parameter, such as every minute, every 5 minutes, every 30 minutes, every hour, every 12 hours, every 24 hours, etc. The pre-defined timing parameter can be provided to the API 530 using a graphical user interface associated with any of the BMS 400, BEMS gateway 450, BEMS 540, etc. In some embodiments, the pre-defined timing parameter is BEMS gateway-specific, is specific to a particular installation of the infrastructure item (such that, for example, some systems are monitored and synchronized more frequently than others), etc.

Referring now to FIG. 7, a process 700 is shown for data propagation from an example BMS and an example BEMS, according to an example embodiment. The API 530 of FIG. 5 can be configured to perform the process 700. Furthermore, the BMS controller 366, the BEMS 540, the data propagation circuit 458 of the BEMS gateway 450 and/or any other computing device as described herein can be configured to perform the process 700.

The process 700 includes auto configuration of setup involving space, meters, equipment, monitoring points, etc. Generally, BEMS systems are used to monitor different, geographically dispersed facilities. When a new facility is set up, setting up a digital infrastructure that matches the physical infrastructure can be time-consuming and error-prone. Furthermore, configuring infrastructure items, such as electrical equipment, and mapping these to exact locations significantly complicates commissioning of a new product. The process 700 is structured to facilitate these processes, which may include creation of digital items corresponding to physical installations of infrastructure items (facilities, space, equipment, etc.), mapping monitoring points to equipment templates, mapping monitoring points to meters, etc.

In step 702, the API 530 is structured to receive an input file. The input file can be provided by a user (e.g., an administrator of the BEMS 540) through a graphical user interface provided by the BEMS 540, which can be a form on a desktop-based application, a web page, an applet, a mobile application, etc. The user can browse the file system directory to select the input file. The input file can be a delimited text file, an XML file, an Excel spreadsheet, etc. The input file comprises a plurality of records, each record corresponding to an item that needs to be configured (e.g., a monitoring point.)

In step 704, the API 530 is structured to extract each record from the input file and validate the input items against a set of rules. For example, the API 530 can be configured to use the delimiters provided in the input file to extract individual data items, validate the length, data type, and/or object signature format, determine if data (e.g., an object signature, a suffix, etc.) is missing, etc. If data is missing or invalid, then in step 706, the API 530 is structured to generate an exception notification message and transmit the message to a user. The message can be transmitted as an SMS, an email, a record in an electronic log file, etc.

In step 708, the API 530 is structured to create batches of validated input items (e.g., group like records). For example, the API 530 can be structured to generate separate batches (e.g., electronic files, etc.) that contain validated records pertaining to space/locations, equipment, mapping information, monitoring points, etc.

In step 710, the API 530 is structured to access configuration instructions. In some embodiments, each record in the input file and/or the batch file(s) contains data fields that include information on configuration instructions, such as mapping information, etc.

In steps 712 and 714, the API 530 is structured to implement the configuration instructions. In an example embodiment, the API 530 is structured to first configure spaces by, for example, loading the corresponding batch file(s) into an appropriate data store associated with the BEMS 540. The API 530 is structured to then proceed to configure equipment items by, for example, loading the corresponding batch file(s) into an appropriate data store associated with the BEMS 540. The API 530 is structured to then proceed to create and/or update monitoring points based on the validated batched input items and configuration instructions. For example, the configuration instructions may call for an update of an equipment record to associate a new monitoring point with the equipment record. In some embodiments, steps of the process 700 are performed periodically based on a pre-defined timing parameter, such as every hour, every 12 hours, every 24 hours, etc.

Referring now to FIG. 8, a process 800 is shown for data synchronization between an example BMS and an example BEM, according to an example embodiment. The API 530 of FIG. 5 can be configured to perform the process 800. Furthermore, the BMS controller 366, the BEMS 540, the data propagation circuit 458 of the BEMS gateway 450 and/or any other computing device as described herein can be configured to perform the process 800.

The process 800 includes periodically generating historical information requests for monitoring points missing data. Generally, BEMS need up-to-date data from data sources in order to perform reporting and analytics on the state of equipment. Data can be "pushed", through the API 530, to the BEMS 540 in real-time; however, the downtime of the source system may interfere with these operations such that the source systems and the BEMS 540 become out of sync.

The steps of the process 800 are performed periodically based on a pre-defined performance parameter. In step 802, the API 530 is structured to determine the value of the pre-defined performance parameter. The pre-determined performance parameter can be a timing parameter, such as every hour, every 12 hours, every 24 hours, etc. The pre-determined performance parameter can be supplied by a user. In some embodiments, the pre-determined performance parameter is based on a window of time the source system was not operational. In such embodiments, the value for the pre-determined performance parameter can be determined by, for example, polling the BEMS gateway 450 associated with the source system to determine how long the source system was down.

In step 804, the API 530 is structured to identify and/or poll the source system. In some embodiments, the API 530 can be configured to poll certain source systems based on a predetermined schedule. In some embodiments, all source systems are polled every 24 hours. In some embodiments, after a source system is back on-line after a period of downtime, the BMS 400 and/or the BEMS gateway 450 are configured to "push" a notification to the BEMS 540 through the API 530, which initiates a historical data read process.

In step 806, the API 530 is structured to identify the monitoring points that need to be updated. This identification can be made by querying a data vault of the BEMS 540 to find all monitoring points mapped to the source system.

In step 808, the API 530 is structured to cause the source system to transmit updates for the points identified at 806. The API 530 can be structured to transmit point identifiers and/or source system identifiers to the source system to facilitate a historical data read. Alternatively, in some embodiments, the API 530 can be structured to read all incoming data from the source system and identify the records that need to be updated in the target system based on the source id, the time window corresponding to source system downtime, etc. In some embodiments where a large number of historical records needs to be read, the API 530 can be structured to create separate batches of incoming records (e.g., 5,000 points per batch) and process these batches separately at steps 810-812.

In step 808, the API 530 is structured to validate the updated data received from the source system. This can be accomplished by performing validation processes as described with reference to FIG. 6 and/or FIG. 7.

In step 808, the API 530 is structured to transmit the validated items to the BEMS 540 and cause the BEMS 540 to load these items into its data store.

Configuration of Example Embodiments

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building enterprise management system, the system comprising a non-transitory memory, a processor, and a processing circuit configured to execute computer-readable instructions, stored in the non-transitory memory, to:
   receive, from a source computing system, an electronic item corresponding to a building infrastructure item, wherein the electronic item comprises at least an object signature including a string of characters for identifying the building infrastructure item;
   validate the object signature, comprising:
      determine, based on the object signature, a data source associated with the building infrastructure item, wherein the data source comprises a plurality of data objects and wherein each of the plurality of data objects corresponds to a particular installation of the building infrastructure item;
      for each of the plurality of data objects,
         determine a signature suffix, wherein the signature suffix is associated with at least one of a current version and a current configuration of the particular installation of the building infrastructure item; and
         generate a validated object signature, comprising append the signature suffix to the object signature; and
      identify a target computing system and transmit the validated object signature to the target computing system.

2. The system of claim 1, wherein the processor is further configured to, based on a pre-defined timing parameter, periodically obtain the electronic item corresponding to the building infrastructure item.

3. The system of claim 1, wherein the electronic item comprises a plurality of object signatures.

4. The system of claim 1, wherein the processor is further configured to, based on a pre-defined performance parameter comprising a predetermined record count, batch some of a plurality of validated object signatures into a data file according to the pre-defined performance parameter, wherein a number of the plurality of validated object signatures in the data file does not exceed the predetermined record count.

5. The system of claim 4, wherein the pre-defined performance parameter comprises an identifier of at least one of a building infrastructure item, the source computing system, and the target computing system.

6. The system of claim 4, wherein the pre-defined performance parameter is based on a window of time corresponding to a non-operational state of at least one of the source computing system and the target computing system; and wherein the processor is configured to determine the plurality of validated object signatures only for object signatures updated during the window of time.

7. The system of claim 1, wherein validate the object signature further comprises:
parse the data object to identify the building infrastructure item;
based on at least one rule associated with the building infrastructure item, determine whether the data object is valid;
generate an electronic notification indicative of whether the data object is valid; and
transmit the electronic notification using a pre-determined notification method.

8. The system of claim 7, wherein the processor is further configured to:
obtain a stored configuration data object from the target computing system;
cause the source computing system to provide a current version of the data object corresponding to the stored configuration data object; and
compare at least a portion of the data object to at least a portion of the stored configuration data object to determine whether the data object is valid.

9. The system of claim 7, wherein the stored configuration data object is received from the target computing system as representational state transfer (REST) message, and wherein the processor is further configured to decode the REST message to extract the stored configuration data object.

10. The system of claim 1, wherein the building infrastructure item is one of a physical space, an equipment item, and a monitoring point.

11. The system of claim 1, wherein the validated object signature is transmitted to the target computing system as representational state transfer (REST) message.

12. A controller communicatively coupled to a particular installation of a building infrastructure item, the controller comprising a memory device having instructions stored thereon that, when executed by one or more processors, cause the one or more processors to:
determine an object signature of the building infrastructure item including a string of characters for identifying the building infrastructure item;
validate the object signature, comprising:
generate, based on the object signature, a data object corresponding to the particular installation of the building infrastructure item;
generate a signature suffix, wherein the signature suffix is associated with at least one of a current version and a current configuration of the particular installation of the building infrastructure item; and
generate a validated object signature, comprising append the signature suffix to the object signature; and
transmit the validated object signature to a target computing system.

13. The controller of claim 12, the controller further structured to, based on a pre-defined timing parameter, periodically update the signature suffix and periodically generate the validated object signature comprising the signature suffix.

14. The controller of claim 12, wherein the controller is further structured to:
determine a window of time corresponding to a non-operational state of at least one of the particular installation of a building infrastructure item and the target computing system, the window of time comprising at least a start time and an end time;
update the signature suffix and generate the validated object signature; and
transmit the validated object signature and the window of time to the target computing system.

15. The controller of claim 12, wherein the building infrastructure item is one of a physical space, an equipment item, and a monitoring point.

16. The controller of claim 12, the controller further structured to:
obtain a stored configuration data object from the target computing system, wherein the stored configuration data object corresponds to the data object corresponding to the particular installation of the building infrastructure item;
compare at least a portion of the data object to at least a portion of the stored configuration data object to determine whether the data object is valid;
generate an electronic notification indicative of whether the data object is valid; and
transmit the electronic notification to the target system.

17. The controller of claim 12, wherein the validated object signature is transmitted to the target computing system as representational state transfer (REST) message.

18. A method comprising:
receiving, by a processing circuit of a computing system, from a source computing system, an electronic item corresponding to a building infrastructure item, wherein the electronic item comprises at least an object signature including a string of characters for identifying the building infrastructure item;
validating, by the processing circuit, the object signature, comprising:
determining, based on the object signature, a data source associated with the building infrastructure item, wherein the data source comprises a plurality of data objects and wherein each of the plurality of data objects corresponds to a particular installation of the building infrastructure item;
for each of the plurality of data objects,
determining a signature suffix, wherein the signature suffix is associated with at least one of a current version and a current configuration of the particular installation of the building infrastructure item; and
generating a validated object signature, comprising append the signature suffix to the object signature; and
identifying a target computing system and transmitting the validated object signature to the target computing system.

19. The method of claim 18, further comprising, based on a pre-defined timing parameter, periodically obtaining, by the processing circuit, the electronic item corresponding to the building infrastructure item.

20. The method of claim 18, wherein the electronic item comprises a plurality of object signatures.

21. The method of claim 18, further comprising, based on a pre-defined performance parameter comprising a predetermined record count, batching, by the processing circuit, some of the plurality of validated object signatures into a data file according to the pre-defined performance parameter, wherein a number of validated object signatures in the data file does not exceed the predetermined record count.

22. The method of claim 21, wherein the pre-defined performance parameter comprises an identifier of at least one of a building infrastructure item, the source computing system, and the target computing system.

23. The method of claim 21, wherein the pre-defined performance parameter is based on a window of time corresponding to a non-operational state of at least one of the source computing system and the target computing system; and wherein method further comprises determining, by the processing circuit, validated object signatures only for object signatures updated during the window of time.

24. The method of claim 21, wherein validating the object signature further comprises:
parsing the data object to identify the building infrastructure item;
based on at least one rule associated with the building infrastructure item, determining whether the data object is valid;
generating an electronic notification indicative of whether the data object is valid; and
transmitting the electronic notification using a pre-determined notification method.

25. The method of claim 24, wherein the building infrastructure item is one of a physical space, an equipment item, and a monitoring point.

26. The method of claim 24, further comprising:
obtaining, by the processing circuit, a stored configuration data object from the target computing system;
causing, by the processing circuit, the source computing system to provide a current version of the data object corresponding to the stored configuration data object; and
comparing, by the processing circuit, at least a portion of the data object to at least a portion of the stored configuration data object to determine whether the data object is valid.

27. The method of claim 24, wherein the stored configuration data object is received from the target computing system as representational state transfer (REST) message, and wherein the processor is further configured to decode the REST message to extract the stored configuration data object.

28. The method of claim 24, wherein the validated object signature is transmitted to the target computing system as representational state transfer (REST) message.

* * * * *